United States Patent [19]

Guise et al.

[11] 4,191,802

[45] Mar. 4, 1980

[54] COATING OF FIBROUS MATERIALS WITH COMPOSITIONS CONTAINING MIXTURES OF POLYCARBAMOYL SULPHONATES AND OTHER POLYMERS

[75] Inventors: Geoffrey B. Guise; Maxwell A. White, both of Victoria, Australia

[73] Assignee: Commonwealth Scientific and Industrial Research Organization, Campbell, Australia

[21] Appl. No.: 867,491

[22] Filed: Jan. 6, 1978

Related U.S. Application Data

[63] Continuation-in-part of Ser. No. 461,134, Apr. 15, 1974, abandoned.

[30] Foreign Application Priority Data

Apr. 16, 1973 [AU] Australia ............................... PB3014
Aug. 15, 1973 [AU] Australia ............................... PB4494

[51] Int. Cl.² .................. B05D 3/02; B32B 17/02; B32B 19/00; B37B 9/02
[52] U.S. Cl. ................................. 428/375; 427/386; 427/388 R; 427/389; 427/390 A; 427/390 C; 427/390 D; 427/390 E; 427/390 R; 427/391; 427/392
[58] Field of Search .................. 427/386, 388 R, 389, 427/391, 390 R, 390 A, 390 C, 390 D, 390 E, 392; 428/375

[56] References Cited

U.S. PATENT DOCUMENTS

| 3,152,920 | 10/1964 | Caldwell et al. | 427/390 X |
| 3,519,478 | 7/1970 | Howell | 117/155 |
| 3,639,157 | 2/1972 | Wunder et al. | 427/395 X |
| 3,655,437 | 4/1972 | Becker et al. | 427/430 |
| 3,898,197 | 8/1975 | Guise et al. | 8/192 |

FOREIGN PATENT DOCUMENTS

| 207387 | 4/1957 | Australia | 427/447 |
| 1131006 | 10/1968 | United Kingdom | 427/390 |

*Primary Examiner*—James R. Hoffman
*Attorney, Agent, or Firm*—Dennis P. Clarke

[57] ABSTRACT

A composition comprising:

(1) at least one (poly)carbamoyl or (poly)thiocarbamoyl sulphonate containing at least one radical of the formula —

$$-NH.CO.SO_3^\ominus X^+ \quad\quad [Z]$$

or $$-NH.CS.SO_3^\ominus X^+ \quad\quad [Y]$$

wherein $X^+$ represents a cationic group with one or more positive charges to maintain electrical neutrality in the sulphonate; and (2) at least one non-halogenated polymer selected from the following classes —
  A. polymers derived from the polymerization of ethylenically unsaturated monomers, and
  B. polymers having a backbone of carbon atoms and at least one ester, amide, ether, urethane, urea, sulphide, disulphide, thioamide, sulphone, or carbonate linkage.

5 Claims, No Drawings

COATING OF FIBROUS MATERIALS WITH COMPOSITIONS CONTAINING MIXTURES OF POLYCARBAMOYL SULPHONATES AND OTHER POLYMERS

RELATED APPLICATIONS

This application is a continuation-in-part application of application Ser. No. 461,134, filed Apr. 15, 1974, and now abandoned.

BACKGROUND OF THE INVENTION (1) Field of the Invention

The invention relates to novel polymeric compositions and the application of such compositions to materials, particularly fibrous materials.

(2) Description of the Prior Art

Co-pending U.S. Pat. application Ser. No. 330,404, in the name of G. B. Guise and M. B. Jackson, and filed on Feb. 7, 1973, now U.S. Pat. No. 3,898,197, discloses a number of prior art systems for preventing wool shrinkage, and describes and claims certain addition products having improved shrink-proofing properties.

SUMMARY

It is an object of the present invention to provide compositions and methods for the shrink-proofing of keratinous materials exhibiting still further improved shrink-proofing properties. It was an unexpected finding of the present invention that compositions in accordance with the invention, including the combination of the addition products referred to above and certain other polymers, afforded considerably better shrink-proofing properties than provided by either component of the combination or anticipated by such a combination.

Further and more wide-spread objects of the invention are to provide compositions and methods for conferring on suitable materials, usually of a keratinous or other fibrous nature, a considerable number of other desirable properties of the type referred to hereinafter.

More specifically, the present invention provides a composition comprising:

(1) at least one (poly)carbamoyl or (poly) thiocarbamoyl sulphonate containing at least one radical of the formula — or $$-NH.CS.SO_3^\ominus X^+ \qquad [Z]$$

or $$-NH.CS.SO_3^\ominus X^{30} \qquad [Y9]$$

wherein $X^{30}$ represents a cationic group with one or more positive charges to maintain electrical neutrality in the sulphonate; and (2) at least one non-halogenated polymer selected from the following classes -

A. polymers derived from the polymerization of ethylenically unsaturated monomers, and B. polymers having a backbone of carbon atoms and at least one ester, amide, ether, urethane, urea, sulphide, disulphide, thioamide, sulphone, or carbonte linkage.

DESCRIPTION OF THE PREFERRED EMBODIMENTS

The compositions may contain, in addition, non-polymeric materials, e.g., water, surfactants, and salts, and these will be described in detail below.

$X^+$ is preferably an alkali metal, alkaline earth metal, ammonium, substituted ammonium, phosphium or sulphonium cation, and is most preferbly the sodium, potassium or ammonium ions, or a mixture of two or more of the three previously mentioned ions.

The polycarbamoyl and polythiocarbamoyl sulphonates are preferred to the monocarbamoyl and monothiocarbamoyl sulphonates, and are hereinafter abbreviated to PCS. Thus, a PCS in the composition of the invention has one of the following generalized structures (III) -

where
$n \geq 2$,
$1+m \geq 2$, and
R is an organic radical

It is to be appreciated that in the following discussion where the structural unit Z is used this may be wholly or partially replaced by Y.

The preferred examples of PCS for the purposes of the present invention have structure IV.

where
$R^1$ is an organic radical
Z and n, are as defined above
Y can partially or wholly replace Z and S can wholly or partially replace O.
W is a difunctional organic radical
V is a difunctional radical drawn from one or more of the groups, —O—, —S—, —NH—, —NR"—, where R" is an alkyl or aryl radical, preferably methyl, ethyl, phenyl or benzyl.

The difunctional organic radical W may consist of a chain of carbon atoms which may bear substituents, contain unsaturated linkages, aromatic rings or hetero atoms such as oxygen or sulphur. W may also be an aromatic ring, an aromatic ring system, or a heteroaromatic ring or ring system.

Examples of structures (IV) may be provided by the following reactions

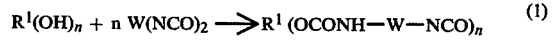

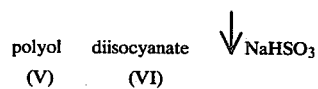

(where X = Na)

The O in VI may be replaced by S to give $R^1(OCSNH-W-Y)_n$.

The OH in V may be replaced by SH or NH₂ or, alternatively, $$R(NH_2)_n + n\ WZ_2 \rightarrow R(NHCONH-W-Z)_n \quad (2)$$

in which Z would be wholly or partially replaced by Y.

It is to be appreciated that structures IV may be obtained by other methods, and the above reactions are only presented by way of example.

The most preferred examples of structure (IV) have structure VII, i.e. the most preferred PCS for class A of the present invention.

$$R^1(OCONH-W-Z)_n \quad \text{VII}$$

and these may be prepared from polyols and diisocyanates as in reaction (1) above.

Particularly advantageous examples of structure VII have n between 2 and 4 most preferably between 2.5 and 3.5 and have W with one of the structures shown in the following list:

| | Preferred W structure | corresponding diisocyanate VI |
|---|---|---|
| (i) | —(CH₂)ₖ— most preferably k = 4 or 6 | tetramethylene or hexamethylene diisocyanate respectively |
| (ii) | —CH₂—CH(CH₃)—CH₂—C(CH₃)(CH₃)—CH₂CH₂— | trimethylhexamethylene diisocyanate |
| (iii) | —(CH₂)ⱼ—CH(—(CH₂)ₖCH₃)—CH(—(CH₂)ₖCH₃)—(CH₂)ⱼ— | the commercial product dimer acid diisocyanate (General Mills) is of this type |
| (iv) | (cyclohexyl structure with —CH₂— and CH₃, CH₃, CH₃ substituents) | isophorone diisocyanate |
| (v) | (phenylene) and isomers | phenylene diisocyanate |
| (vi) | (naphthylene) and isomers | naphthylene diisocyanate |
| (vii) | (phenyl)—CH₃ and isomers | tolylene diisocyanate |
| (viii) | —CH₂—(phenyl)—CH₂— and isomers | xylylene diisocyanate |
| (ix) | (cyclohexyl)—CH₂—(cyclohexyl) and isomers | bis-(4-isocyanatocyclohexyl)methane |
| (x) | (phenyl)—CH₂—(phenyl) | bis(4-isocyanatophenyl)methane |
| (xi) | —(CH₂)₄—CH(CO₂Me)— | lysine diisocyanate |

It is to be appreciated that some of these W structures are asymmetrical and either end may be joined to NH group in Structure VII.

Groups $R^1$ suitable for structure VII of the present invention are shown in the following list, together with the corresponding polyol (V) from which VII may be derived by means of reactions in equation (1).

| Group R¹ | | corresponding polyol V |
|---|---|---|
| (xii) | CH₂—<br>\|<br>CH₂—<br>\|<br>CH₂ | glycerol |
| (xiii) | CH₃C(CH₂—)₃ | trimethylol ethane |
| (xiv) | CH₃CH₂C(CH₂—)₃ | trimethylol propane |
| (xv) | CH₂<br>\|<br>—CH₂—C—CH₂—<br>\|<br>CH₂— | pentaerythritol |
| (xvi) | \|  \|  \|<br>CH₂—CH—CH—CH₂CH₂CH₃<br>and isomers | hexane triol |
| (xvii) | CH₂—Rᵣ—<br>\|<br>CH—Sₛ—<br>\|<br>CH₂—Tₜ—    VIIIa | |
| (xviii) | ⟋Rᵣ—<br>CH₃CH₂C—Sₛ—    VIIIb<br>⟍Tₜ— | |
| (xix) | —Rᵣ—    VIIIc | | where the groups R, S, and T may contain groups drawn from one or more of the following repeating units attached to each other in any order or direction.

$$-OCH_2-\underset{\underset{CH_3}{|}}{CH}-, \quad -OCH_2CH_2-, \quad \text{or} \quad -O-\underset{\underset{CH_3}{|}}{CH}-\underset{\underset{CH_3}{|}}{CH}-$$

where r, s and t are each between 1 and 50.

The polyols corresponding to structures VIII are polypropylene oxide and polyethylene oxide glycols and triols. The preferred examples of structure VIII polyols have molecular weights in the range 300–5000 most preferably 400–4000.

Further examples of polyols suitable for preparation of PCS of structure VII include polyoxytetramethylene glycols, polycaprolactone polyols, hydroxyl terminated polybutadiene, butadiene-styrene, or butadiene-acrylonitrile copolymers, castor oil and other glycerides of hydroxyacids, polymerized castor oils, the reaction products of ethylene oxide or propylene oxide and castor oil and the like.

As particular examples of PCS, there may be mentioned —

(1A) products of the structure

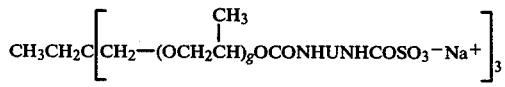

where U=(CH₂)₆ where g is from 1 to 40, in particular when g=14–18. Such a product may be derived from the corresponding polyisocyanate and bisulphite salts, and in the following discussion will be referred to by the abbreviation BAS. The proprietary product Synthappret LKF (manufactured by Bayer AG, Germany) is believed to be similar to the parent polyisocyanate. Such a polyisocyanate may be prepared from the corresponding triol, which is available commercially as Desmophen 3400 (Bayer AG., Germany), and hexamethylene diisocyanate.

(2A) as (1A) but —UNHCOSO₃ is

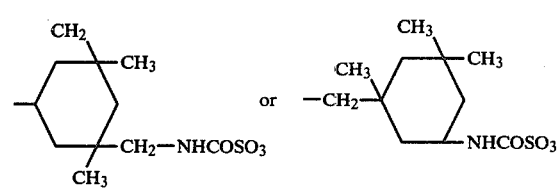

in particular when g=14 to 18 which can be prepared from bisulphite salts and the polyisocyanate derived from Desmophen 3400 and isophorone diisocyanate (3A) as (1A) but

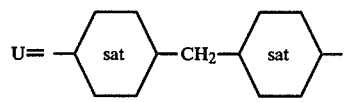

in particular when g=14 to 18 which can be prepared from bisulphite salts and the polyisocyanate derived from Desmophen 3400 and bis(4-isocyanatocyclohexyl)methane.

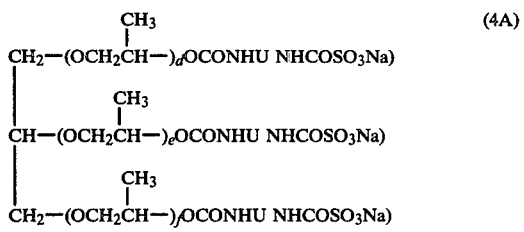

(4A)

in particular d, e, f=14 to 18 and U=—(CH₂)₆—which can be derived from bisulphite salts and the polyisocyanate derived from hexamethylene diisocyanate and the commerical polypropylene oxide triol Voranol CP 3000 (Dow).

(5A) as (4A) but d, e and f are approximately 1, and U=—(CH₂)₆—which can be similarly prepared from the commercial product Voronol CP260.

(6A) As (4A) but with U as in (2A)
(7A) As (4A) but with U as in (3A)
(8A) Products of the structure CH₃CH₂C[CH₂OCONHU'NHCOSO₃⁻Na⁺]₃ where U is as in (1A), (2A) or (3A). For example the PCS prepared from a bisulphite salt and the polyisocyanate produced by the reaction of trimethylol propane and hexamethylene diisocyanate, isophorone diisocyanate or bis(4-isocyanatocyclohexyl)methane.

(9A) The product of the structure

NA⁺⁻O₃SCONH(CH₂)₆N(CONH(CH₂)₆NH-COSO₃⁻Na⁺)₂ which may be prepared from the corresponding triisocyanate and bisulphite salts. This triisocyanate may be prepared from the reaction of 3 moles of hexamethylene diisocyanate and one mole of water and is sold commerically as Desmodur N (Bayer AG., Germany).

It is to be further appreciated that the PCS of the present invention may be of uniform structure or a mixture of PCS may be used. Also such PCS may contain products with less than two carbamoyl sulphonate groups per molecule, for example carbamoyl sulphonates prepared from monoisocyanates and bisulphite salts such as alkyl isocyanates with from two to twenty carbon atoms, phenyl isocyanate or substituted phenyl isocyanates. Also low molecular weighted dicarbamoyl sulphonates may be present for example those derived from the diisocyanates (VI) listed above and bisulphite salts, in particular hexamethylene diisocyanate, isophorone diisocyanate and the like.

Suitable non-halogenated polymers (2) of the present invention may have a backbone consisting solely of carbon atoms. Such polymers can be formally considered to be derived from the polymerization of ethylenically unsaturated monomers. Such polymerizations are well known to those skilled in the art of polymer chemistry. Such monomers include the following which may be used alone or in combination; ethylene, propylene, the isomeric butylenes, butadiene, isoprene, styrene, the esters and ethers of vinyl alcohol, acrylic and methacrylic acid and their salts, esters, amides, nitriles and acid chlorides, vinyl sulphonic acid, vinyl pyridine, vinyl pyrollidone, maleic acid, allyl alcohol and derived esters and ethers and the like.

Alternatively the backbone of the polymer (2) may contain in addition to carbon atoms one or more of the following types of linkages; ester, amide, ether, urethane, urea, sulphide, disulphide, thioamide, sulphone, carbonate, or the like and thus may be a polyester, polyamide, etc. Such Class B polymers are well known in the prior art and the preparation is well known to those skilled in the art of polymer chemistry.

Polymers (2) may be used singly or in mixtures and may be water insoluble or water soluble. In the case of water insoluble materials these are most preferably in the form of emulsions, dispersions, latices or dispersions of solutions of such polymers in water immiscible solvents. Such dispersions are hence associated with water in which PCS dissolves.

It is desirable but not essential that polymers (2) of the present invention contain one or more groups from the following classes.
(a) primary amines
(b) secondary amines
(c) alcohols
(d) thiols
(e) thiophenols
(f) phenols
(g) carboxylic acids
(h) epoxides
(i) episulphides
(j) aziridines
(k) blocked isocyanates, blocked with the groups such as phenols, thiols, alcohols, amines, amides, β-diketones, oximes, β-ketoesters.

Subsequent chemical reaction between these groups and carbamoyl sulphonate or thiocarbamoyl sulphonate groups is conceivable and such reaction is desirable but not essential.

Polymers (2) may also be of natural origin, for example, proteins or polysaccharides including gelatin, collagen, zein, casein, starch alginates and the lile. Such natural polymers may be further modified by synthetic chemical reactions, for example, carboxymethylcellulose.

Preferred examples of polymers (2) may be drawn from one or more of the following classes.

B1. acrylic polymers or copolymers preferably in the form of latices, dispersions or emulsions.
B2. latices of polymers or copolymers of styrene butadiene or acrylonitrile.
B3. latices of polymers or copolymers of vinyl acetate.
B4. polyurethane latices.
B5. blocked isocyanates
B6. epoxy resins Classes numbers 1 -3, inclusive, constitute polymers whose backbones are essentially carbon atoms alone whereas other linkages are present in the classes 4–6.

Suitable class B1 acrylic polymers or copolymers may be prepared by emulsion polymerization methods from a monomer mixture which contains at least 20% of an ester of acrylic or methacrylic acid and a lower aliphatic alcohol. Such acrylic esters include methyl, ethyl, propyl, n-iso and sec butyl, 2-ethylhexyl acrylates and methacrylates. In addition the following monomers may be present: acrylic or methacrylic acid, acrylamide or methacrylamide (or their N alkyl or N,N dialkyl derivatives), acrylonitrile, methacrylonitrile, the N-methylol or N,N-dimethylol derivatives of acrylamide or methacrylamide or the amides of methacrylic and acrylic acid with primary amines, or the corresponding ethers of the previously mentioned methylolamides, glycidyl, acrylate, glycidyl methacrylate, allyl glycidyl ether, maleic anhydride, itaconic anhydride, vinylisocyanate, allyl isocyanate, vinyl pyridine, dimethylaminoethylmethacrylate and acrylate, tert-butylaminoethylmethacrylate.

A number of such products are commercially available and are well known to those skilled in the art of polymer chemistry and these include the following commercial products.

Primals
K3, K-14, K-87
HA-4, HA-8, HA-12, HA-16,
TR-520
B-15,
AC-33, AC-61, AC-73,
E-358, E-485, E-740, E-751, (Rohm and Haas);
Valbonds 6001, 6004, 6020, 6021, 6022, 6025, 6053, 6063 and 6055, Valchem Australia Ltd.;
Polyco 2705, 2719 (Borden Chemical Co.);
Texicryl
   13-001, 13-002, 13-003, 13-010;
   13-100, 13,101, 13-102, 13-104;
   13-200, 13-201, 13-202, 13-203;
      13-205, 13-430, 13-439;
Scott Bader Ltd.;
Acramins Lc, 3232, 3132, SLN (Bayer AG); GEN-Flo 704, (General Mills);
Helazarin Binders FA, UD, TS, NTA, (BASF Ltd.);
Vinacryl 63-307 (Vinyl Products Ltd.);
Nacrylic X4280, X-4260 (National Starch and Chem. Corp;)
Stan Chem 6006, 6016, 6016, 6033 (Stanchem Inc.);
Hycar 2600×172, 2600X181 (B.F. Goodrich and Co.);

Suitable Class B2 polymers are derived from the polymerisation of a mixture containing by weight at least 20% of one or more of the following monomers, acrylonitrile styrene or butadiene. In addition the monomers listed above for class 1 may be present. A number of such products are commercially available and are well known to those skilled in the art of polymer chemistry and include the following commercial products.

Acralen BN (BASF);
Polyco 22ONS, 2410, 2415, 2422, 2426, 2430, (Borden Chemical Co.);
Dow Latex 233, 464, 460 (Dow Chemical);
Hycar 1872 X6, 1552, 1562, 1571, 2601, 2671, 2600 ×84, 2600 —106, 2570 —1, 2570 ×5, 2530 ×2, 1871 —1, 1877 —8, 1870 ×3, 1870 ×4 (B.F. Goodrich Chemical Co.).

Suitable Class B3 polymers are derived from the polymerisation of a mixture containing at least 20% by weight of vinyl acetate. The following monomers may also be pressure vinyl propionate, and esters of fumaric and maleic acid. In such polymers some of the acelate groups may be subsequently hydrolysed to form vinyl alcohol residues.

Vinac AX-10, AX -11 (Airproducts and Chemicals); Airflex 120 ("");
Polyco 678W, 804, 804PL, 199, 345, 1360 -15, 529, 577G, 694, 953, 2185, 1361 - 413 1404 - 30, 11714, 289, 561, 11755,571, 2166, 505, 522. (Borden Chemical Inc.);
Resyn 1025, 78 - 3500, 78 - 5301, 78 - 5344, (Nahonal Starch and Chemical);
Kemres 1101/00, 1101/05, 1102/00, 1103/00, 1204, 1205, 1210, 1216, 1230. (Kemres Chemicals Pty. Ltd.);
Polymer 5001, 5004, 5011, 5012, 5022, 5024, 5024, 5026 (Stan Chem. Chemicals Inc.);
Texicote 63 - 001, 03 - 004, 03 - 004, 03 - 006, 03 - 007, 03 - 019, 03 - 020, 03 - 021, 03 - 030, 03 - 050 (Scott Bader Ltd.).

Polyurethane latices or dispersions suitable for class B4 of the present invention characteristically contain a plurality of urethane linkages and in addition may contain ester or ether linkages. Such polyurethane latices are produced from the reaction of diisocyanates and polyols, for example as described in Australian Pats. Nos. 62076/69, 424333, 17876/70, British Pats. No. 1,078,202, German Pats. No. 2,035,729 2,2041,550, 2,035, 172 2,013,160 2,030,571 and 2,034,479, and are also described by D. Dieterich and H. Reiff Angewandte Makromolekulare Chemie, 26, 85–106, 1972. Examples of commercially available polyurethane lactices include —

Dunlop Resin J67, 664 787, (Dunlop Aust Ltd.),
Desmocoll KA 8066 (Bayer AG Germany),
Impranil BLN and DLH (Bayer AG Germany),
Polyurethane Dispersion B (Bayer AG Germany).

Blocked polyisocyanates suitable for use as class B5 of the present invention may be formally derived from the reaction of a blocking agent and a polyisocyanate. Such blocked isocyanates on heating may reform the original isocyanate or by heating with nucleophilic reagents may produce the same products as from the reaction of the same nucleophilic reagent with the parent isocyanates. Examples of blocking groups are above. The polyisocyanates may be any of those discussed previously from which PCS may be derived.

A particular effective example of such polymers containing blocked isocyanates suitable for the purposes of the present invention is the products Adiprene BL16 (du Pont) which has a structure of the following type;

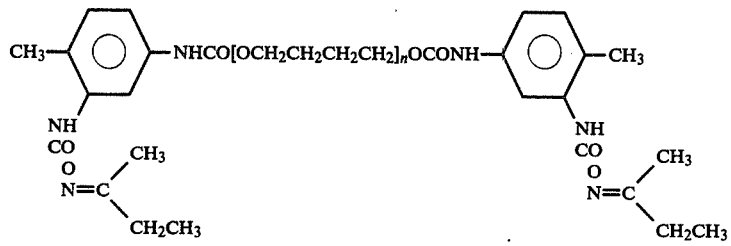

As suitable epoxy resins suitable for class B6 there may be mentioned glycidyl ethers from bisphenol-A or novalac resins and epichlorhydrin, the glycidyl esters of polycarboxylic acids and the glycidyl ethers of polyethylene or propylene oxide polyols or those derived from the epoxidation of ethylenically unsaturated polymers. As particular examples of such epoxides there may be mentioned the Epikote series of Shell Chemicals, Araldite products of CIBA-Geigy and DER series of Dow Chemical Co.

A further type of epoxy-containing polymer suitable to use in the present are those derived from the reaction of isocyanate-containing prepolymers with glycidyl alcohol to give epoxy terminated polyurethanes as described by Sello et al in Textile Research Journal 1971 p. 556. Also there may be used the corresponding aziridine-terminated polyurethanes as described in U.S. Pat. No. 3,542,505 and Australian Pat. No. 63504/69. A further type of aziridine-terminated polymer are those described in Textile Research Journal, 33, (1963) 953, which in addition contain fluorine atoms.

To the compositions of the present invention various agents may be added in order to alter the physical properties of the composition or to alter the properties of the treated fibrous material. Such agents may be water soluble or insoluble. Such agents may be present as a separate phase or may be dissolved in the solution containing the PCS. In the case of the polymeric material (2) forming a separate phase, e.g., as a latex or dispersion, such agents may be dissolved in the latex or dispersion particles.

Furthermore, there may be added to the compositions of the present invention, agents known to improve the curing of the PCS component. Such agents preferably contain two or more thiol or amino groups. As particularly effective of such agents there may be mentioned ethylene diamine, diethylenetriamine and related higher ethylene diamine polyamines, ethanolamine 1,2-ethane-dithiol. Quadrol (a product of the Wyandotte Company N,N,N'N'-tetrakis (2-hydroxyethyl)ethlenediamine), 4,4'diamine diphenylmethane, MOCA (a product of the du Pont Company, with 2:2'-dichloro-4,4'-diamino-diphenyl-methane structure) and the like.

Another class of such agents are those known to catalyze the reactions of isocyanates and their derivatives, e.g., tertiary amines (in particular triethylenediamine) or organometallic compounds (e.g., stannous octoate, stannic chloride, dibutyl tin dilaurate, lead napthenate, stannous napthenate; bismuth octoate and the like). There may also be added to compositions of the present invention agents to improve the curing of the other polymeric class B component as defined above. Such agents are commonly used for the curing of soft acrylic latices on textiles and are usually N-methylol and poly N-methylol and alkylated N-methylol derivates of compounds containing more than one amide (e.g. urea, biuret, cyclic ureas) or amide-like amino groups (such as in melamine) which are prepared by reaction with the parent compound with formaldehyde or a higher aldehyde and may or may not be subsequently alkylated. As particular examples of such agents there may be mentioned curing agent RK-8 (Rohm and Haas) Cymels 300 and 301 (American Cyanamide).

Additional agents include salts, acids, bases, organic solvents, agents to modify the colour of the treated material (e.g. dyes, fluorescent whitening agents or pigments, agents to modify the burning properties (e.g. flame retardants), agents to modify the soiling properties, agents to modify the oil and/or water repellency, agents to modify the pH of the composition (e.g. acids, bases, buffers salts), surface active agents, agents to modify the properties of the polymeric materials derived from the composition (e.g. plasticizers, antioxidants, UV screens, antiozonides and the like), agents to modify the viscosity (e.g. thickening agents).

As particularly useful examples of commercial antioxidants there may be mentioned the following commercial products —Plastanox 2246 (American Cyanamid), Irganox 415 (CIBA-Geigy), Annullex PBA-15 (William Pearson), Product 4020 (Bayer).

Such agents may be incorporated in either or both of (1) and (2) compounds or may be added during the mixing of (1) and (2) compounds in preparation of the compositions of the invention.

The compositions of the present invention are particularly suited for the treatment of fibrous materials. However, it is to be appreciated that they may be used for other applications. The fibrous materials suitable for treatment with the compositions of the present invention may be in the form of loose fibre, card sliver, roving, yarn, fabric, sheets (e.g. papers), felts, garments, or other. The fabrics may be constructed by weaving, knitting, or non-woven means or by a combination of such means. In addition, such fabrics or sheets may be bonded by means of resins or other means to other fabrics to form multi-layer structures.

Any of the natural or synthetic fibres which fall in the categories below are suitable for the purposes of this invention.

(a) Natural Fibres

Such as flax, jute, hemp, cotton, and wool and natural fibres of inorganic origin such as asbestos.

(b) Fibres formed by the Regeneration of Natural Materials

Such as casein, zein, rayon viscose, and alginate fibres.

(c) Man-made Fibres

Prepared from modified cellulosic materials such as cellulose acetate and tri-acetate.

(d) Man-made Fibres of Inorganic Origin

Such as glass, metal and carbon fibres.

(e) Fibres Prepared from Synthetic Polymers

From the following general classifications: polyamides, polyesters, polyacrylics, modified acrylics, polyvinyl, chlorides, polyolefins, polyethylenes, polyvinyl and vinylidene fibres and the like.

Blends which are used, for example, for economic effect, or performance reasons, of any of the above classes in any ratio, are considered to be within the scope of the invention.

The compositions of the present invention are particularly suited for the treatment of wool or wool blended with other fibres such as polyester. Such fibres may have been subjected to physical or chemical pretreatments. For example, the reaction of wool with halogen particularly chlorine or compositions which release chlorine (e.g., hypochlorite) oxidizing agents, (e.g., hydrogen peroxide permonosulphuric acid, potassium permanganate) or reducing agents (e.g., bisulphite salts, sodium dithionite or thioglycollic acid.

Impregnation of fibrous materials with the compositions of the present invention may be by padding, dipping, spraying, brushing, knife coating, or the like, or by combinations of such methods. Fabrics are most effectively treated by padding. Subsequently, to remove water and other volatile substances and also in order to assist in curing of the polymeric mixture, the treated fibrous material may be subjected to a heat treatment. Such heating may be by a direct contact with heated bodies in the form of solid liquids or gases, e.g., hot air or steam or by a radiative means (infrared microwave heating or the like) or by a combination of such methods.

For the purpose of the invention the amount of both the PCS and the other polymeric components should both preferably lie in the range 0.1 to 50% of the weight of the fibrous material and most preferably in the range 0.2 to 5.0%. Such concentrations are dependent on the nature of the fibrous material, the exact nature of the polymeric components (1) and (2) and the type and degree of improvements desired in the fibrous material, and are best determined by experiment.

Compositions of the present invention have been found advantageous in a number of applications. The following examples are provided to illustrate, but not limit, the invention.

1. For the treatment of textile materials to provide improvements to such properties as abrasion resistance, dimensional stability, pilling resistance, snagging resistance, wrinkle recovery, strength, smooth drying after wetting or washing, and tailorability, where the tendency of materials (especially knitted materials) to curl and roll on cutting or distort on sewing, is essentially eliminated.

2. For the treatment of formed paper products to provide, in particular, papers of greater tear and burst strength and abrasion resistance or for the formation of paper products of improved properties where a composition according to the invention is added to the cellulose fibre slurry.

3. For the treatment of fabrics which may be in the form of fibrous webs, filaments or layered combinations to give chemically bonded non-woven fabrics of improved properties especially strength. Compositions of the invention may also be applied to mechanically bonded non-wovens for the purpose of improving in particular their strength and abrasion resistance.

By suitable selection of the class (1) or (2) materials, properties in addition to the above such as flame resistance, water and oil repellency, and soiling resistance can be imparted to the material.

The compositions of the present invention find particular advantage in imparting a high level of shrink-resistance to materials comprises wholly or partially of keratinous fibres. Such compositions have one or more of the following advantages over shrinkresist treatments of the prior art, (i) Application from aqueous systems in contrast to certain prior art treatments (e.g. those based on the use of polyisocyanates alone e.g. British Patent Nos. 1062564 and 1161748) where it is necessary to apply from non-aqueous solvent in order to prevent premature reaction with water.

(ii) The stability of compositions of the present invention in contrast to compositions of the prior art which are unstable and must be used immediately as curing will occur at room temperature before application. For example, with polymers containing free isocyanate groups, application from aqueous baths can only be achieved by emulsification of thepolymers. This constitutes an additional processing step, but more importantly, the prepared emulsion has only a relatively short life because the isocyanate groups react with the water in the emulsion. Furthermore, free isocyanate groups can cause problems in handling due to the presence of volatile low molecular weight fragments which are toxic.

(iii) The treatment of keratinous materials, in particular wool without the necessary requirement of damaging pretreatments such as chlorination. In many polymer shrinkresist methods of the prior art such pretreatments are obligatory in order to obtain shrinkresistance; for example, those based on polymers from the reaction of certain polyamides with epichlorhydrin (C. A. Anderson et al, Textile Manufacturer Vol. 95, No. 1133, p. 184, 1969).

(iv) The production of a softer handle in the resultant treated textile material than when PCS is used alone by virtue of the improved mechanical properties of the polymer composite.

(v) The greater durability of the cured polymer coating to subsequent thermal and photo degradation. Compositions of the present invention particularly where the co-applicant of the PCS is an acrylic copolymer (e.g., Primal K3, Rohm and Haas), have greater thermal and light stability than those treatments based on PCS or the parent isocyanate terminated prepolymer alone.

(vi) The ability to produce minimum thermal degradation in keratinous materials and other thermally sensitive fibres by the ease with which curing occurs at 100° C.

For example, polyurethane dispersions when used alone to impart shrinkage resistance to wool require a temperature of 140° for curing. However, when used in admixture with PCS, curing occurred at 100° C. Also certain crosslinkable acrylates (e.g. Primal K3, Rohm and Haas) normally require a temperature of 130° for curing when used alone, but with PCS readily cure at 100°.

(vii) The ability to cure under neutral conditions, in contrast to certain compositions (particularly those derived from cross-linkable acrylates) which require acid conditions either by direct addition of acid or salts that produce an acid reaction (e.g. ammonium salts such as ammonium chloride) or salts which act as acidic catalysts (e.g. zinc chloride or fluoroborate). Such acid treatments are known to be damaging to the keratinous materials, and generally require an additional processing step to neutralise such acidity in order to prevent subsequent degradation of the keratinous material.

(viii) The production of stable creases per se and the production of permanent press effects if combined with a setting method of the prior art, and the per se production of permanent press effects.

Such set stabilization is due to the constraints imposed by the cured polymer film and the release by the PCS of bisulphite, a known wool setting agent, during the curing reaction.

(ix) The ability to bind pigments to produce dyeings fast to rubbing.

(x) The production of delayed cure setting effects, i.e. the material is treated but not cured at the fabric stage and then after making up the garments and forming these into the desired shape, curing is then effected which stabilizes the material in the desired shape. To accomplish such a delayed cure process it is essential that no curing occurs in the drying operation which inevitably follows applications of aqueous solutions of compositions of the present invention. This can be achieved if the drying is carried out at low temperatures preferably below 80° C.

Such advantageous features from treatment of keratinous materials with compositions of the present invention can most readily be seen in combination of PCS's and cross-linkable acrylic latices. For example, combination of PCS and Primal K3. The later if used alone, even in the presence or methylol curing agents is unable to impart shrinkresistance to worsted wool fabrics unless prechlorinated. However, in combination with PCS it is possible to impart shrinkresistance to worsted wool fabrics, and in particular to concentrations where there is not sufficient PCS if used alone to impart shrinkresistance.

Compositions of the present invention when applied to keratinous materials and cured in the manner described above simultaneously impart in the one treatment operation, without the necessity of additional treatments, combination of shrinkresistance and one or more of the following properties:

(a) flame resistance
(b) water and stain repellency
(c) colour by the binding of pigments
(d) improved wrinkle recovery
(e) crease stabilization, which may be to such an extent that the garments so treated can be considered to be permanently pressed.

In addition, such properties are retained after subsequent washing operations, particularly when washed with domestic washing machines.

To obtain such combinations of desirable properties by methods of the prior art, it is either necessary to resort to a series of successive treatments which may damage the keratinous material or each such successive treatment may not be completely compatible with each other and may lower the effectiveness of each other. Such an effect has been observed by Fincher et al (Textile Research Journal, Vol. 43, October, 1973, p. 623-625) where treatment with polymeric shrinkresist compositions of chemically flame retardant wool caused complete loss of the flame retardancy. Alternatively, methods of the prior art to get such combination of effects may not be fast to repeated washings, e.g. particularly under the severe washing conditions which the shrinkresistance allows to be used.

The combination of water or stain repellency with shrinkresistance can be observed with combinations of PCS's, in particular BAS, with fluorinated polymers.

In the discussion above, the ability of PCS's and other compounds especially acrylics to stabilize keratinous materials to washing shrinkage was noted. These combinations act equally as well on non keratinous materials and have especially advantages on fabrics containing or comprising cellulosic fibres. For improvements to dimensional stability and smooth drying properties such fabrics are normally treated with a methylated urea formaldehyde resin, or a dimethylol ethylene urea resin, or similar, an acid catalyst such as magnesium chloride, and various additives to control sewability, tear strength, handle, finish migration, and abrasion resistance. Similar effects including delayed cure treatments can be obtained by using a PCS product or products in combination with other polymeric materials but, however, without the strength and abrasion losses on the cellulosic component always found when using acid catalysts. The treatment according to the invention may allow a more economic choice of fibre components while still maintaining the same performance. For example, permanent press materials are frequently comprised of 70% polyester fiber and 30% cotton or viscose fibre. Increasing the percentage of the cellulose fibre, although providing an economic advantage, greatly reduces the abrasion resistance and strength of the resultant permanent press fabric where conventional acid curing resins are used. Use of a PCS and other selected materials according to the invention allows the use of more advantageous blend proportions without causing a loss in fabric physical properties.

It is to be appreciated that many modifications can be made to the methods described above and that all such modifications are considered to be within the scope of this invention. The following examples are provided to illustrate the present invention but are not to be construed as limiting the invention in any way.

EXAMPLES

Wash tests were performed for 1 hr in a 50 liter Cubex international machine with 12.5 liters of wash liquor and 1 Kg of goods comprising of about 20 test samples and polyester weighting squares. Wash liquor was a solution at 40° of 0.2 g/l $Na_2HPO_4$, 0.1 g/l $NaH_2PO_4$ and 0.05 g/l Alkanate D (ICI). Samples were relaxed in a solution containing 0.05% $NaHCO_3$ and 0.5% lux for 20 minutes, measured washed for 1 hr as above, measured again and the area shrinkage calculated; under these conditions untreated fabric A shrank 70%.

Flame Resistance

An undyed woven plain weave worsted fabric of 220 g/m² was tested according to Federal Test Method, Standard 191, Textile Test Method No. 5903. In this test a flame impinges on a vertical strip of fabric (5 cm×30 cm) for 12 seconds and, to pass, the flame must extinguish within 15 seconds with an average burn length not greater than 20 cm.

Flexural Rigidity (a measure of fabric stiffness and handle) of fabric pieces was measured in accordance with B.S. 3356:1961.

BAS was prepared using the following method; Synthappret LKF (1 Kg) was stirred vigorously whilst absolute ethanol (2 liters) and solution of sodium metabisulphite (110 g) in water (1 liter) were added as rapidly as possible. After 5-10 minutes the mixture cleared and Plastinox 2246 (American Cyanamid) (10 g) was added. The resultant clear solution infinitely dilutible with water, contained about 20% solids BAS.

EXAMPLE 1

A plain weave wool worsted fabric (10 picks/cm, 10 ends/cm, 153 g/m²) was padded to give the following percentage add-ons as shown in Table 1 and dried at 100° C. for 5 min. then given a washing test.

TABLE 1

| Treatment | Washing Shrinkage % |
|---|---|
| Untreated | 70 |
| 0.6% BAS | 52 |
| 2.4% Primal E485 (Rohm and Haas) | 64 |
| 2.4% Primal E485, 0.6% BAS | 2 |
| 3% Primal K3 (Rohm and Haas) | 62 |
| 2.4% Primal K3, 0.6% BAS | 1 |
| 3% Hycar 1872 X6 (B.F. Goodrich) | 66 |
| 2.4% Hycar, 0.6% BAS | 0 |
| 3% Oligan 500 (CIBA-Geigy) | 53 |
| 2.4% Oligan, 0.6% BAS | 1 |
| 3% PVA 205 (Poval Chemical) | 68 |
| 2.4% PVA 205, 0.6% BAS | 18 |
| 3% Polyurethane Latex J67 (Dunlop Australia) | 68 |
| 2.4% Polyurethane Latex J67 + 0.6% BAS | 5 |
| 3% Polyurethane Latex 664 (Dunlop Australia) | 65 |
| 2.4% Polyurethane Latex 664 + 0.6% BAS | 3 |
| 3% Polyurethane Dispersion V (Bayer) | 65 |
| 2.4% Polyurethane Dispersion V, 0.6% BAS | 3 |
| 3% Impranil DLN (Bayer) | 65 |
| 2.4% Impranil DLN, 0.6% BAS | 5 |
| 3% Impranil DLH (Bayer) | 67 |
| 2.4% Impranil DLH, 0.6% BAS | 2 |
| 3% Chemitex 1210 (Kemrez Chemicals) | 70 |
| 2.4% Chemitex 1210, 0.6% BAS | 8 |
| 3% Casein | 70 |
| 2.4% Casein, 0.6% BAS | 22 |
| 3% Gelatin | 69 |
| 2.4% Gelatin, 0.6% BAS | 19 |

Neither small concentrations of the BAS alone nor large concentrations of the acrylic (E485 and Primal K3), nitrile (Hycar 1872×6) and polyurethane (Latex J67, Latex 664, Dispersion V and Impranil DLN and DLH) latices, the polythiol resin (Oligan 500), the vinyl alcohol (PVA 205), the vinyl acetate (Chemitex 1210), and the casein and gelatin compounds alone were able to shrinkresist the worsted fabric. In all cases, however, the combination according to the invention were effective in substantially reducing the felting shrinkage.

EXAMPLE 2

A grey, plain weave, commercial worsted suiting fabric of 254 g/m² was treated as described in Example 1 to give the following results.

| Treatment | Washing Shrinkage | Flexural Rigidity (warp) (mgm cm) |
|---|---|---|
| Untreated cloth | 71 | 232 |
| 3% E485, 0.1% CO630 | 64 | 261 |
| 3% BAS | 0 | 669 |
| 2.4% BAS, 0.6% E485 | 0 | 541 |
| 2.4% BAS | 1 | 625 |
| 1.8% BAS, 1.2% E485 | 1 | 506 |
| 1.2% BAS, 1.8% E485 | 0 | 396 |
| 0.6% BAS, 2.4% E485 | 2 | 387 |
| 0.6% BAS | 52 | — |
| 0.45% BAS, 2.55% E485 | 3 | 368 |
| 0.3% BAS, 2.7% E485 | 3 | 324 |

The ratio of the PCS compound, BAS, may be varied at will to provide variations in fabric handle whilst maintaining the shrinkresist effect.

EXAMPLE 3

The invention may be used to advantage to confer anti-pilling treatments particularly on garments knitted from wool or wool blended with synthetics.

For example, three knitted wool fabrics of varying cover factors but each produced from the same yarn on the same machine were treated with 2.4% E485 and 0.6% BAS. After drying for 5 min at 100° C. the fabrics were subjected to a pilling test as described in ASTM D1375 E "Random Pilling Tester" with the exception that the results are recorded as the number of pills formed on the face of the fabric after 30 min of testing.

| Cover Factor[a] | 1.42 | 1.26 | 0.98 |
|---|---|---|---|
| | Pill Count | | |
| Untreated | 16 | 35 | 69 |
| Treated | 1 | 7 | 19 |

[a]Cover factor defined as the reciprocal of the multiplication of the square root of the worsted count of the knitting yarn and the stitch length (inches).

EXAMPLE 4

The invention may be used to advantage in conferring smooth drying or permanent press properties to a fabric.

A commercially available plain weave worsted suiting of 254 g/m² was treated with 2.4% Primal K3 (Rohm and Haas) and 0.6% BAS. The fabric was dried for 5 min at 90° C. and steamed on a semi-decating machine for 30 sec.

The fabric was then washed according to the Specification No. 72 of the International Wool Secretariat namely; 3 consecutive washes in a 50 liter Cubex machine containing 15 liter of water buffered to pH 6.8 at 40° C. and containing 0.5% soap. At the end of each hour of wash testing, the fabrics were removed from the machine, squeezed by hand and dried by hanging vertically in a drying cabinet.

The advantageous effect on fabrics treated according to the invention can be seen from the following table:

| AATCC Durable Press Rating* | | | | |
|---|---|---|---|---|
| Testing Time (hrs) | 0 | 1 | 2 | 3 |
| Untreated | 5 | 2.6 | 1.4 | 1.0 |
| Treated | 5 | 4.5 | 4.2 | 4.5 |

*Fabrics rated according to AATCC Test Method 124 - 1967. A rating of 5 is essentially a perfectly flat piece of fabric.

EXAMPLE 5

The invention may be used to advantage in reducing the airing temperature of polyurethane dispersions. Samples of wool fabric of 170 g/m² were padded with the compositions described below, dried for 5 min. under the conditions shown, and then assessed for washing shrinkage.

| Treatment | Temperature | Shrinkage |
|---|---|---|
| (a) 3% Polyurethane Dispersion PU 787 (Dunlop) | 95° C. | 27% |
| (b) As above | 110° C. | 15% |
| (c) As above | 125° C. | 2.3% |
| (d) 2.4% PU787, 0.6% BAS | 95° C. | 1.8% |
| (e) 0.6% BAS | 95° C., 110° C. | 50–55% |
| | 125° C. | |

Addition of a small quantity of BAS to a polyurethane dispersion capable of shrinkresisting the wool if cured at high temperature, substantially reduces the curing temperature.

EXAMPLE 6

Samples of a light weight polyester/cotton (65%/35%) shirting material were treated with 1.6% Primal K3 and 0.4% BAS.

After drying for 5 minutes at 120° C. a panel of observers judged the treated fabric to have a handle barely different from the untreated fabric.

The area shrinkage according to the boiling water test of British Standard BS2959:1958 was 7.2% for the untreated control and 1.5% for the treated.

The pill rating, using the Random Tumbler Pill Tester (American Society for Testing Materials, Test D1375E) was 4 for the treated fabric and 2 for the untreated control. The rating is based on a scale of 1 to 5, the higher the rating the better the appearance.

On cutting the material, the treatment caused the material to remain flat, whereas the untreated material curled considerably.

The treatment according to the invention offered an excellent handle together with improved resistance to pilling shrinkage and curling on cutting.

EXAMPLE 7

A double knit ponte di Roma fabric comprised of staple polyester fibres was treated 1.6% Primal K3 and 0.4% BAS by padding and dried for 5 minutes at 120° C.

A panel of observers judged the fabric to have a handle little changed from the control.

The snagging propensity of the treated and untreated fabrics was assessed using the ICI Mace Testing Unit (Textile Journal of Australia, 46, February 1971, p.24). The snagging rating was 4 for the treated fabric, and 2-3 for the untreated control. The rating is based on a scale of 1 to 5, the higher the rating the better the performance.

A boiling water shrinkage test (BS 2959) produced an area shrinkage of 6.7% in the untreated fabric and 2.0% in treated fabrics. On drying after the boiling water test the fabrics were assessed for smooth drying properties (AATCC Test Method 124:1969). The untreated fabric had a smooth dry rating of 4 whereas the treated fabric had the maximum rating of 5. A rating of 5 indicates a perfectly flat appearance.

The treatment according to the invention offered an excellent handle together with good antisnagging and smooth drying properties.

EXAMPLE 8

A sample of a lightweight cotton shirting fabric was treated with 8% of a cyclic nitrogenous reactant (Valrez H-17, Valchem) 0.75% zinc nitrate and 0.75% magnesium chloride (A). The treated fabric was dried at 110° C. and then cured at 160° C. for 10 minutes.

A sample of the same fabric was treated with 2.0% Primal K3 and 1.0% BAS and dried for 5' at 120° C. (B).

The combination of the warp and weft recovery angles (measured according to B.S. 3086:1959) was 256° for treatment B and 248° for treatment A. The untreated fabric had a combined recovery angle of 208°. A combined recovery angle of 360° indicates a complete recovery from creasing.

The durable press ratings (AATCC Test Method 124:1969) after a 1 hour cubex wash test were 3.5–4.0 for both fabrics A and B.

The tensile strength of fabric A was 60–65% of the untreated control whereas the strength of fabric B was not affected. The tensile strength was tested according to ASTM Method IR of D168204.

Treatment of the cotton fabric according to the invention (B) gave good smooth drying and crease recovery performance but without the loss in tensile strength as shown by the example of a conventional treatment (A).

EXAMPLE 9

A light weight all wool single jersey fabric and a heavy all wool upholstery fabric were treated according to the formulations below, dried for 5 minutes at 120° C. and assessed for abrasion resistance using a standard Martindale Abrasion tester.

|  | Abrasion Resistance* | |
|---|---|---|
|  | Single Jersey | Upholstery Fabric |
| (a) Control | 15,000 | 31,000 |
| (b) 2.4% Primal K3, 0.6% BAS | 21,000 | 40,000 |
| (c) as (b) plus a polyethylene wax emulsion 1% (Valsof 3049, Valchem) | 26,000 | 48,000 |

*The number of rubs required to abrade a hole in the fabric.

EXAMPLE 10

Samples of wool fabric of 170 g/m² were padded with the composition as listed below, dried for 5 min at 120° C. and then assessed for fastness of the finish to light exposure. Samples were tested for shrinkage resistance after exposure to sunlight for such times as indicated by fading of the Society of Dyers and Colorists Blue Scale Reference Standards (BS1006:1961). The arbitary standard for light fastness was chosen as the Blue Scale Standard at which the test piece on washing shrunk 5 to 10% in area. The higher the number the better the lightfastness. A fastness of standard 6 is regarded as acceptable.

| Treatment | Fastness Standard |
|---|---|
| 1. 3% BAS | 5 |
| 2. 3% BAS, 0.03% Annullex PBA-15* | 6–7 |
| 3. 2.4% Primal K3, 0.6% BAS | 7 |
| 4. 2.4% Acralen AS,** 0.6% BAS | 6–7 |
| 5. As 3 plus 0.03% Annullex PBA-15 | 7–8 |
| 6. As 4 plus 0.03% Plastanox 2246*** | 7–8 |

*Annullex PBA-15, WM. Pearson, Hull. A hindered phenolic antioxidant
**Acralen AS, Bayer, an acrylic copolymer.
***Plastanox 2246, American Cyanamid. A hindered phenolic antioxidant.

The treatments according to the invention (3 and 4) offer improvements in lightfastness equal to or better than the incorporation of antioxidants. Coapplication of an antioxidant with the treatments according to the invention makes further improvements to the lightfastness.

EXAMPLE 11

A length of single jersey all wool underwear material in the unscoured state, was treated by padding to produce 2.3% Primal K3, 0.7% BAS, and 1% sodium bicarbonate by weight on the weight of material. After drying for five minutes at 105° C. the material was scoured with a synthetic detergent in the usual way. Without an intermediate drying step the material was dyed on a winch to a navy shade using reactive dyestuffs. A similar scouring and dyeing treatment was carried out on untreated material.

During dyeing the untreated material shrunk 18% in area and there was considerable hairiness together with lack of stitch clarity. The material treated according to the invention shrunk only 3% in area and maintained the surface appearance of the original material.

After dyeing the material treated with the BAS and Primal K3 was subjected to a Cubex wash test. After one hour an area shrinkage of 3% was found.

What is claimed is:

1. A method for the treatment of a fibrous material, which method comprises treating the material with a composition comprising (A) at least one compound selected from the group consisting of:

(1) products of the structure

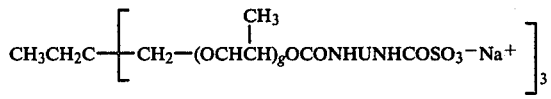

wherein U=(CH₂)₆, g is from 1 to 40;

(2) products of the structure stated in (1) wherein—UNHCOSO₃ is:

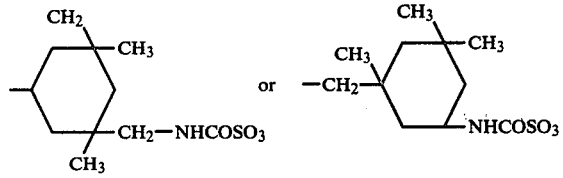

g is from 1 to 40;

(3) products of the structure stated in (1) wherein U is

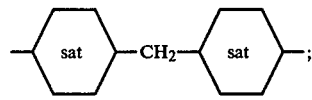

g is from 1 to 40;

(41) products of the structure

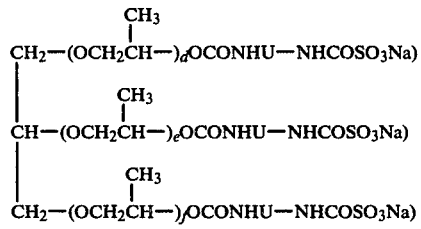

wherein U is —$(CH_2)_6$— and d, e, and f are from 14–18;

(5) products of the structure stated in (4) wherein d, e and f are 1, and U is —$(CH_2)_6$—;

(6) products of the structure stated in (4) wherein U is as stated in (2) and d, e, and f are from 14–18;

(7) products of the structure stated in (4) wherein U is as stated in (3) and d, e and f are from 14–18;

(8) products of the structure

$CH_3CH_2C[CH_2OCONHU—NHCOSO_3^-Na^+]_3$ wherein U is as stated in (1), (2) or (3); and, (9) the product of the structure

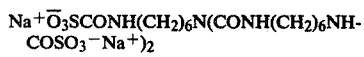
$Na^+\bar{O}_3SCONH(CH_2)_6N(CONH(CH_2)_6NH-COSO_3^-Na^+)_2$ and (B) at least one non-halogenated polymer selected from the group consisting of (a) acrylic polymers or copolymers;
(b) latices of polymers or copolymers of styrene; butadiene or acrylonitrile;
(c) latices of polymers or copolymers of vinyl acetate;
(d) polyurethane latices;
(e) blocked isocyanates; and,
(f) epoxy resins and heating the treated material to remove any volatile substances present and to assist in curing of the composition.

2. A method according to claim 1, wherein the fibrous material is wool or a wool blend.

3. A method according to claim 1, wherein the material is treated with from 0.1 to 50% by weight of the composition, based on the weight of the material.

4. A method according to claim 1, wherein the material is treated with from 0.1 to 50% by weight of the composition, based on the weight of the material.

5. A fibrous material treated by the method of claim 1.

* * * * *

UNITED STATES PATENT AND TRADEMARK OFFICE
CERTIFICATE OF CORRECTION

PATENT NO. : 4,191,802
DATED : March 4, 1980
INVENTOR(S) : GEOFFREY B. GUISE and MAXWELL A. WHITE It is certified that error appears in the above–identified patent and that said Letters Patent are hereby corrected as shown below:

Column 20, line 30, in the structural formula, insert a subscript 2 after CH (first occurrence)

Signed and Sealed this

Tenth Day of June 1980

[SEAL]

Attest:

SIDNEY A. DIAMOND

Attesting Officer

Commissioner of Patents and Trademarks